United States Patent
Peace

(10) Patent No.: US 11,078,848 B2
(45) Date of Patent: Aug. 3, 2021

(54) GAS TURBINE ENGINE FIREPROOFING

(71) Applicant: ROLLS-ROYCE plc, London (GB)

(72) Inventor: Richard Peace, Derby (GB)

(73) Assignee: ROLLS-ROYCE plc, London (GB)

(*) Notice: Subject to any disclaimer, the term of this patent is extended or adjusted under 35 U.S.C. 154(b) by 387 days.

(21) Appl. No.: 16/142,109

(22) Filed: Sep. 26, 2018

(65) Prior Publication Data
US 2019/0107056 A1    Apr. 11, 2019

(30) Foreign Application Priority Data
Oct. 9, 2017   (GB) .................................... 1716499

(51) Int. Cl.
| | | |
|---|---|---|
| *F02C 7/25* | (2006.01) | |
| *F02C 7/32* | (2006.01) | |
| *A62C 2/06* | (2006.01) | |
| *F02K 3/06* | (2006.01) | |
| *B64D 45/00* | (2006.01) | |

(52) U.S. Cl.
CPC .................. *F02C 7/25* (2013.01); *A62C 2/06* (2013.01); *F02C 7/32* (2013.01); *B64D 2045/009* (2013.01); *F02K 3/06* (2013.01); *F05D 2240/15* (2013.01); *F05D 2260/231* (2013.01)

(58) Field of Classification Search
CPC ............................ F02C 7/25; B64D 2045/009
See application file for complete search history.

(56) References Cited

U.S. PATENT DOCUMENTS

| | | | |
|---|---|---|---|
| 3,981,466 A  * | 9/1976 | Shah ..................... | B64D 15/02 244/134 R |
| 4,471,609 A  * | 9/1984 | Porter ..................... | F02C 7/20 60/797 |

(Continued)

FOREIGN PATENT DOCUMENTS

| | | |
|---|---|---|
| EP | 2546148 | 1/2013 |
| EP | 3217001 | 9/2017 |
| GB | 2501000 | 10/2013 |

OTHER PUBLICATIONS

International Organization for Standardization, ISO 2685:1998(E), Aircraft—Environmental test procedure for airborne equipment—Resistance to fire in designated fire zones, Dec. 15, 1998, Second edition, pp. 1 and 13-20. (Year: 1998).*

(Continued)

*Primary Examiner* — Gerald L Sung
*Assistant Examiner* — Marc J Amar
(74) *Attorney, Agent, or Firm* — Oliff PLC

(57) ABSTRACT

A gas turbine engine has a nacelle providing an external skin of the engine, a casing structure radially inwards of the external skin and providing an outer surface of an air flow duct of the engine, and plural engine components located in the bay formed between the casing structure and the nacelle. The components are part of either a first set of components or a second set of components. The components of the first set are all the components from the bay which are potential ignition sources, and the components of the second set are all the remaining components from the bay. The engine further has a container located in the bay, the container being fireproof capable of withstanding the application of heat by a standard flame for 15 minutes and the container containing the components of the first set.

10 Claims, 3 Drawing Sheets

(56) References Cited

U.S. PATENT DOCUMENTS

| | | | | |
|---|---|---|---|---|
| 5,038,560 A * | 8/1991 | Seed | .......................... | F02C 7/14 60/226.1 |
| 7,526,921 B2 * | 5/2009 | Williams | .................. | F02C 7/05 60/796 |
| 8,631,637 B2 * | 1/2014 | DeDe | ........................ | F02C 7/25 60/39.091 |
| 9,145,834 B2 * | 9/2015 | Frost | .......................... | F02C 7/36 |
| 2003/0126854 A1 * | 7/2003 | Cazenave | ............... | F01D 9/065 60/226.1 |
| 2005/0017876 A1 * | 1/2005 | Ziarno | ...................... | F02C 9/00 340/945 |
| 2006/0075754 A1 * | 4/2006 | Champion | ................ | F02C 7/36 60/772 |
| 2006/0101804 A1 * | 5/2006 | Stretton | .................... | F02C 7/32 60/226.1 |
| 2011/0155847 A1 * | 6/2011 | Journade | ................. | A61P 11/00 244/54 |
| 2011/0296847 A1 * | 12/2011 | Williams | ............... | B21D 53/50 60/796 |
| 2013/0019585 A1 * | 1/2013 | Merry | ................... | F01D 17/162 60/226.3 |
| 2013/0145774 A1 * | 6/2013 | Duong | ...................... | F02C 7/00 60/802 |
| 2013/0258583 A1 * | 10/2013 | Balk | ........................ | G06K 1/20 361/679.48 |
| 2014/0060079 A1 * | 3/2014 | Foster | ...................... | F02C 7/20 60/798 |
| 2015/0069068 A1 * | 3/2015 | Hariram | .................. | B60K 1/04 220/560.01 |
| 2015/0183524 A1 | 7/2015 | Casado Montero et al. | | |
| 2015/0361898 A1 | 12/2015 | Webb | | |
| 2016/0069213 A1 | 3/2016 | Fitt et al. | | |
| 2016/0131036 A1 * | 5/2016 | Bintz | ...................... | F01D 25/162 60/779 |
| 2016/0245185 A1 * | 8/2016 | Lamarre | ................ | F01C 11/008 |
| 2017/0211682 A1 | 7/2017 | Ronk et al. | | |
| 2018/0283278 A1 * | 10/2018 | Adibhatla | ............... | F01D 21/14 |

OTHER PUBLICATIONS

Great Britain Search Report dated Mar. 21, 2018, issued in GB Patent Application No. 1716499.7.

* cited by examiner

GAS TURBINE ENGINE FIREPROOFING

CROSS-REFERENCE TO RELATED APPLICATIONS

This application is based upon and claims the benefit of priority from British Patent Application No. GB 1716499.7, filed on 9 Oct. 2017, the entire contents of which are herein incorporated by reference.

BACKGROUND

Technical Field

The present disclosure relates to a fireproofing arrangement of a gas turbine engine.

Description of the Related Art

Aero gas turbine engines typically have an engine bay formed between an outer nacelle of the engine and a casing structure of the engine. Different locations within the bay may be classified as either a fire zone or a non-fire zone within FAA (Federal Aviation Administration) Part 25 regulations or EASA (European Aviation Safety Agency) CS-25 regulations. Once a location is defined as a fire zone, all components mounted in that zone are required to be (1) fireproof under ISO (International Organization for Standardization) 2685 section 2.4 such that the components are capable of withstanding the application of heat by a standard flame for 15 minutes, (2) fire resistant under ISO 2685 section 2.3 such that the components are capable of withstanding the application of heat by a standard flame for 5 minutes or (3) contained in a suitable fire protection box. By a "standard flame" is meant a flame having a temperature of 1100° C.±80° C. and a heat flux density received by the standard apparatus described in paragraph B.4.2 of ISO 2685 of (116±10) kW/m$^2$.

This leads to a situation where component design choices may be constrained by the need for a given component to meet the requirements of a fire zone. For example, a front mount beam of an engine may be formed of titanium alloy for fire resistance, when absent that constraint, it could be formed of aluminium alloy or composite material.

It also requires the various fire and non-fire zones to be suitably partitioned e.g. by fire protection material (e.g. silica fabric layers), and/or the provision of nacelle bulkheads.

Thus performance penalties may be incurred because of the need to provide engine bay fire protection.

It would be desirable to provide an alternative solution to engine bay fire protection which avoids some or all of the penalties.

SUMMARY

Accordingly, the present disclosure provides a gas turbine engine having a nacelle providing an external skin of the engine, a casing structure radially inwards of the external skin and providing an outer surface of an air flow duct of the engine, and plural engine components located in the bay formed between the external skin of the engine and the casing structure, the components being part of either a first set of components or a second set of components;

wherein the components of the first set are all the components from the bay which are potential ignition sources, and the components of the second set are all the remaining components from the bay;

wherein the engine further has a container located in the bay, the container being fireproof according to ISO 2685 section 2.4 such that the container is capable of withstanding the application of heat by a standard flame for 15 minutes, the standard flame having a temperature of 1100° C.±80° C. and a heat flux density received by the standard apparatus described in paragraph B.4.2 of ISO 2685 of (116±10) kW/m$^2$, and the container containing the components of the first set.

By "potential ignition sources" we mean components which have a touch temperature in use of greater than 200° C., or for which the probability of an uncontrolled fire arising from an individual component failure is predicted to be $10^{-8}$ per engine flight hour or greater (noting that the EASA *Certification Specification for Engines* at CS-E510 requires engine safety analysis to be performed in terms of such failure probabilities).

By providing such a fireproof container for the first set of components, engine bay layouts can be created that enable a wider variety of materials choices for components of the second set, and which avoid the need to provide additional partitioning between fire and non-fire zones.

The engine may have any one or, to the extent that they are compatible, any combination of the following optional features.

The engine may have a single fireproof container located in the bay.

With the exception of one or more electrical harnesses, the fireproof container may contain only the components of the first set. Electrical harnesses must typically enter the container in order to connect to the components of the first set. However, such harnesses are generally considered not to be potential ignition sources.

The first set of components may include an accessory gearbox and fuel lines which extend from the accessory gearbox. The first set of components may further include hydraulic lines which extend from the accessory gearbox.

The second set of components may include one or more engine electronic controllers (EECs), one or more oil tanks, oil lines which extend from the oil tanks, an aircraft air system, engine mounts for mounting the engine to an airframe, one or more air/oil heat exchangers, and one or more electrical harnesses. The engine mounts may be formed of aluminium alloy or composite material. The second set of components may further include one or more engine health monitoring units.

The accessory gearbox may be aligned in the axial direction of the engine. In this case, the fireproof container may be at least partly recessed into the casing structure.

The engine may be a ducted fan engine having a bypass duct surrounding a core engine, the casing structure providing the outer surface of the bypass duct. Part of the casing structure may be a fan casing for a propulsive fan of the engine. Other parts of the casing structure may be an intermediate compressor casing and a bypass casing. The external skin may be one or more fan cowls of the nacelle.

DESCRIPTION OF THE DRAWINGS

Embodiments of the present disclosure will now be described by way of example with reference to the accompanying drawings in which.

DETAILED DESCRIPTION

Figure 1:
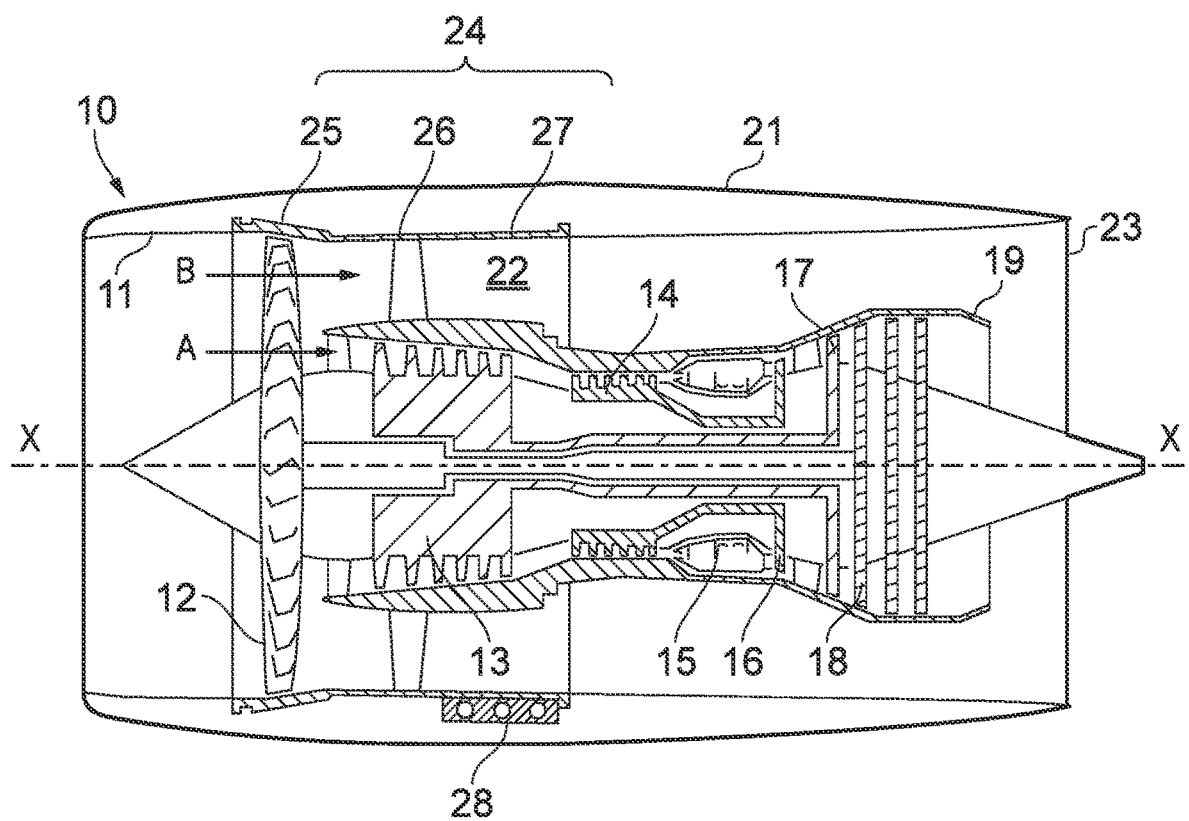
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11. A casing structure 24 inwards of the external skin of the nacelle defines a bypass duct 22. The casing structure 24 can be formed of various sub-structures such as a fan casing 25, an intermediate compressor casing 26 and a bypass casing 27. The nacelle also defines a bypass exhaust nozzle 23.

During operation, air entering the intake 11 is accelerated by the fan 12 to produce two air flows: a first air flow A into the core engine starting at the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Accessory units provide power for aircraft hydraulic, pneumatic and electrical systems, in addition to providing various pumps and control systems for efficient engine operation. The drive for the accessory units is typically taken from one of the engine interconnecting shafts via an internal gearbox (not shown in FIG. 1) to an accessory gearbox 28 which is mounted on the outside of the casing structure 24 (e.g. on the bypass casing 27) in a bay formed between the casing structure 24 and fan cowls which at this position form the external skin of the nacelle 21. The accessory gearbox provides a mounting for the accessory units and distributes an appropriate geared drive to each accessory unit. Other components may also be mounted on the casing structure 24 in the bay, where they are protected by the external skin of the nacelle 21 from the exterior environment.

The accessory gearbox 28 can be axially-aligned, as shown in FIG. 1. According to one option, the accessory gearbox 28 can be simply mounted on the bypass casing 27. However, an alternative is for the bypass casing 27 to comprise a recess (not shown in FIG. 1) configured to accommodate the accessory gearbox 28, so that the accessory gearbox 28 is partially inset into the bypass casing 27 and protrudes less far in a radial direction than if the recess were not present. Radially inward contouring of the bypass casing 27 to accommodate the accessory gearbox 28 results in a corresponding local contouring of the outer surface of the bypass duct 22, which locally reduces the cross-sectional area of the bypass duct 22. This inevitably increases the bypass losses, but these can be mitigated by a corresponding radially inward contouring of the bypass duct 22 inner surface (formed, for example, by fairings of the core engine) so that there is no or less local reduction in the bypass duct 22 cross-sectional area.

Whether recessed or not, the axially-extending accessory gearbox 28 protrudes less far from the bypass casing 27 than would a conventional circumferentially-extending accessory gearbox mounted to the intermediate compressor casing 26. Therefore, the lower part of the nacelle 21 can extend less far from the bypass casing 27 than would otherwise be the case. As a result, the line of the external skin of the nacelle 21 can be reduced, and moreover the overall length of the nacelle 21 can be decreased without introducing aerodynamically unacceptable curvatures. This reduced length and reduced external line can deliver a significant reduction in weight and an aerodynamic benefit compared with an engine having a nacelle that has to accommodate a conventional circumferentially-extending accessory gearbox.

Figure 2:
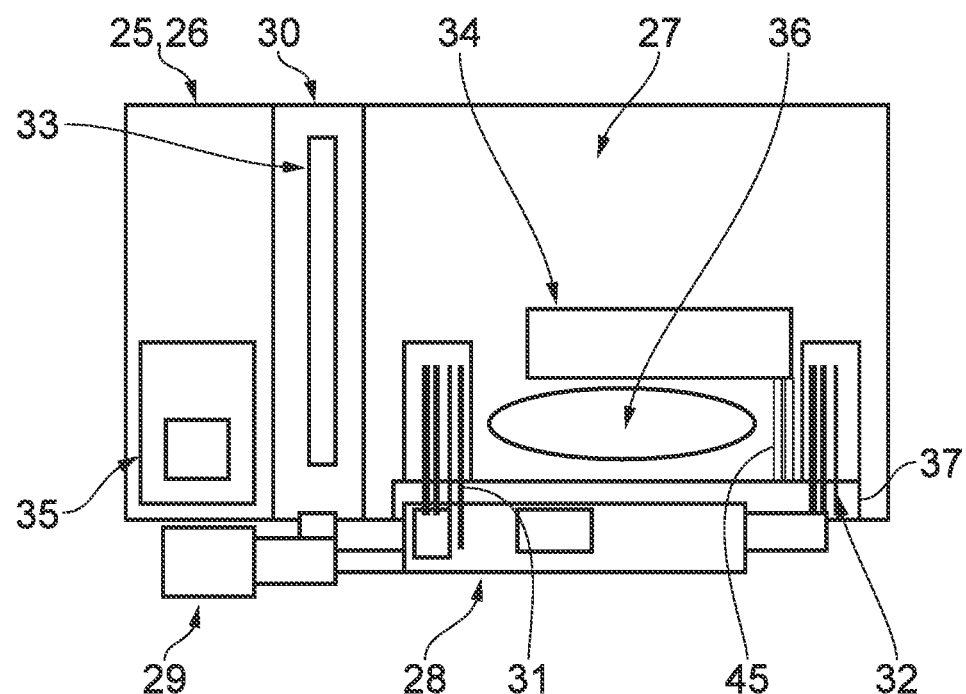
FIG. 2 shows schematically a side view of a casing structure of the engine of FIG. 1, and various engine components which are located in the bay formed between the external skin of a nacelle of the engine and the casing structure.
Figure 3:
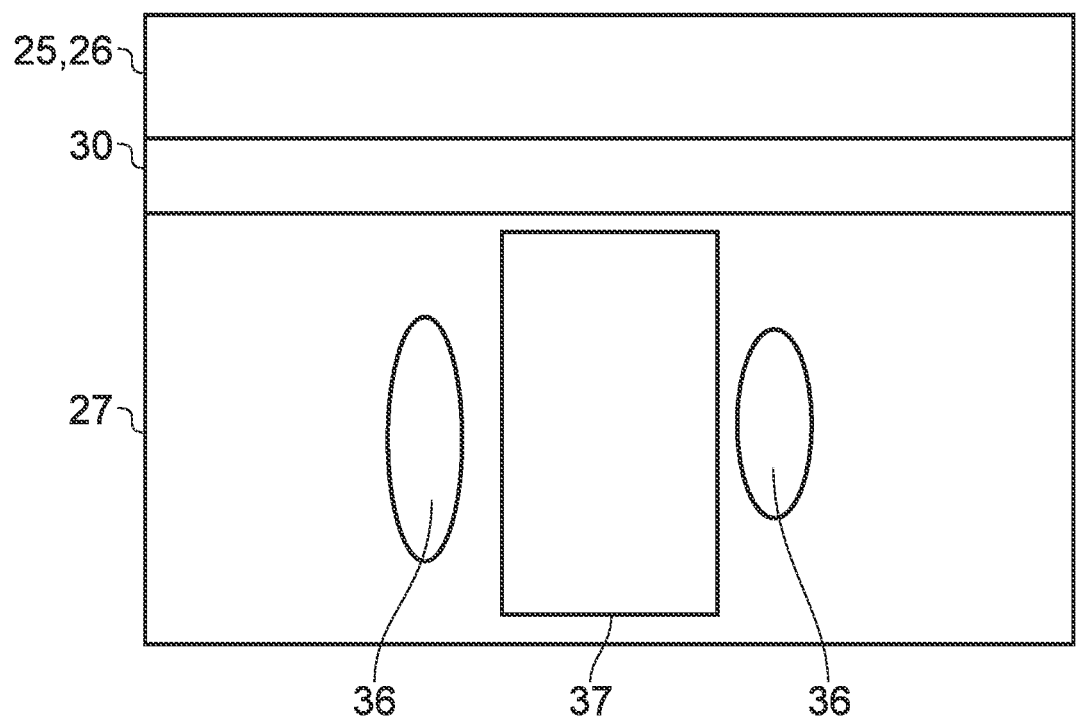
FIG. 3 shows schematically the casing structure of FIG. 2 as it would appear if it were cut through at top dead centre and unrolled from its cylindrical configuration into a planar configuration.

FIG. 2 shows schematically a side view of the casing structure 24 and various engine components which are located in the bay formed between the external skin of the nacelle 21 and the casing structure 24, and FIG. 3 shows schematically the casing structure 24 of FIG. 2 as it would appear if it were cut through at top dead centre and unrolled from its cylindrical configuration into a planar configuration. More particularly, FIG. 2 shows the axially-extending accessory gearbox 28 partially located in a recess 37 formed in the bypass casing 27. However, an NC starter generator 29 portion of the gearbox extends forward past a front frame 30 to about the axial position of the fan casing 25 and the intermediate compressor casing 26. Fuel 31 and hydraulic 32 lines extend from the side of the accessory gearbox 28 and wrap circumferentially part of the way round the engine. Other components located in the bay include a front mount 33 for attaching the engine to an airframe at the front frame 30, a conformal oil tank 34, oil lines 45 which extend from the oil tank, an EEC raft 35, a health monitoring unit (not shown in FIG. 2), one or more air/oil heat exchangers (not shown in FIG. 2), an aircraft air system (not shown in FIG. 2) for providing cabin air and anti-icing air, and numerous electrical harnesses (not shown in FIG. 2) interconnecting the components. Access panels 36 can be formed in either side of the bypass casing 27. A rear mount ring can be integrally formed with the bypass casing 27. Similarly, the front frame 30 can be can be integrally formed with forward portion of the casing structure 24.

The engine components in the bay are divided into two sets. The first set contains all those components which are potential ignition sources, namely the accessory gearbox 28, and the fuel 31 and hydraulic 32 lines which extend from the gearbox. The second set contains the other components in the bay, namely the front mount 33, the oil tank 34, the EEC raft 35, the health monitoring unit, the air/oil heat exchangers, the aircraft air system, and the electrical harnesses.

Figure 4:
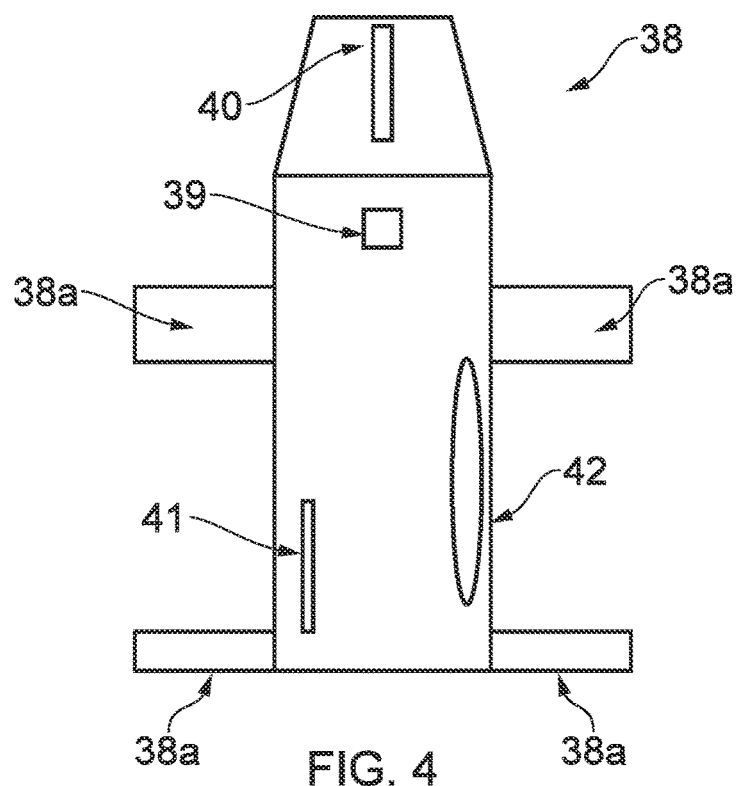
FIG. 4 shows schematically a top view of a fireproof container for the bay of FIG. 2.
Figure 5:
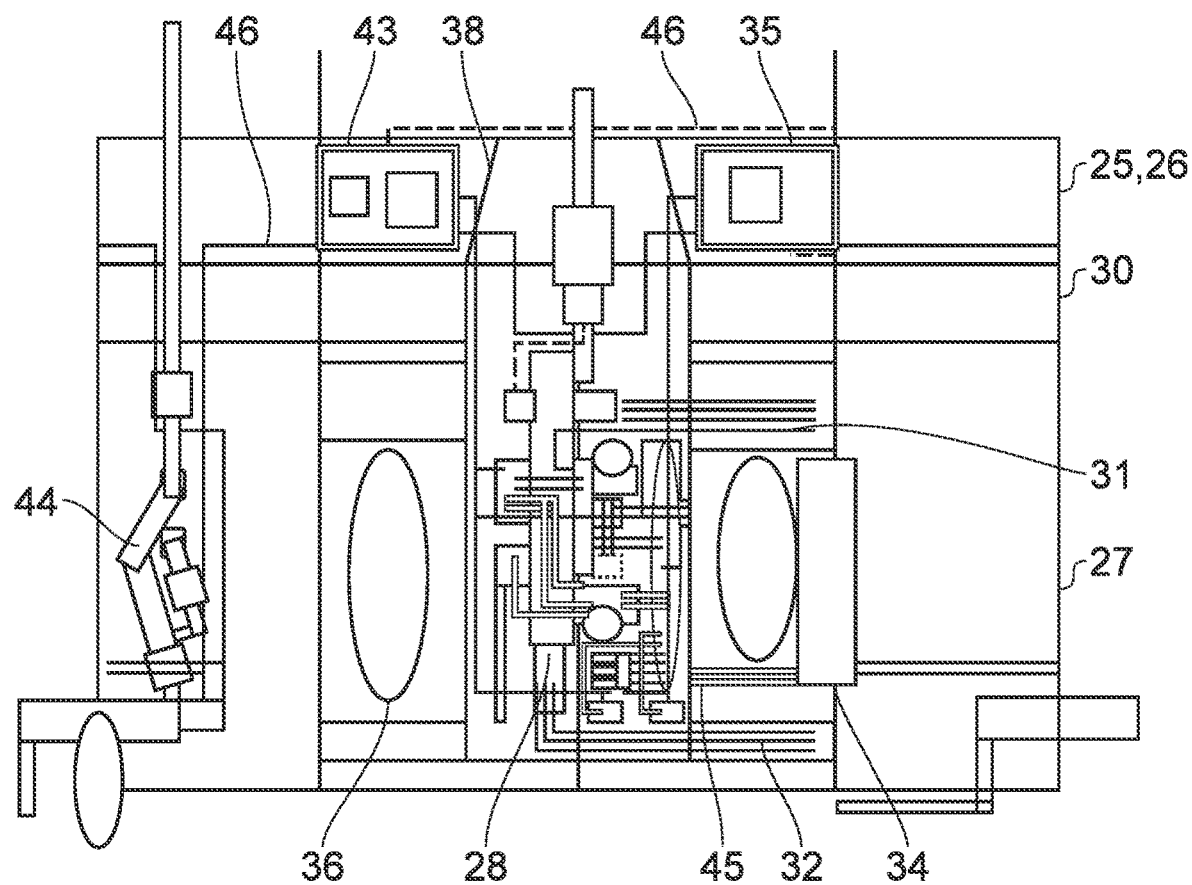
FIG. 5 shows schematically the fireproof container of FIG. 4 and the various engine components of FIG. 2 located on the unrolled casing structure of FIG. 3.

The components of the first set are contained in a fireproof container 38 according to ISO 2685 section 2.4, shown schematically in a top view in FIG. 4. The container envelopes the accessory gearbox 28 and mainly locates in the recess 37, but has side extensions 38a which wrap circumferentially part of the way round the round the engine to house the fuel 31 and hydraulic 32 lines, and a forward portion (uppermost on the page in FIG. 4) to house the starter generator 29. The walls of the container 38 may be formed of metal, composite (e.g. ceramic matric composite), or other sufficiently fireproof material. Various openings are formed in the container, such as a top side aperture 39 for the gearbox drive from the engine's internal gearbox, a bottom side starter inlet duct 40 for the starter generator 29, a bottom side breather duct 41 for exhaust of oil mist from the accessory gearbox 28, a top side splitter tray 42 for other pipework extending from the accessory gearbox 28 to the core engine, and other openings for passage of the electrical harnesses. The openings are configured so as not to compromise the container's fireproofing. FIG. 5 then shows schematically the fireproof container 38 of FIG. 4 and the various engine components of FIG. 2 (including the health monitoring unit 43, the aircraft air system 44, and the electrical harnesses 46) located on the unrolled casing structure of FIG. 3.

With the exception of the electrical harnesses 46, the fireproof container 38 preferably contains only the components of the first set. Thus these harnesses aside, the components of the second set can all be outside the container. This helps with making the container as light and compact as possible.

Advantageously, the components of the first set are all the engine components in the bay formed between the external skin of the nacelle 21 and the casing structure 24 which are potential ignition sources. Thus in effect the container 38 forms a single fire zone in the bay, leaving the rest of the bay as a non-fire zone. By adopting this segregated architecture, an engine bay layout can be created that relaxes fireproofing requirements outside the container 38 and therefore allows a wider design space in terms of configuration and materials choices for all the components outside the container. For example bulkheads can be removed from the nacelle 21, and more extensive use can be made of aluminium alloy or non-metallic materials in the casing structure 24, the front mount 33, and the oil tank 34. In particular, composite materials can be used to form these components. Thus by eliminating ignition sources outside the container 38, significant cost and weight advantages can be achieved.

The axially accessory gearbox 28 is particularly compatible with the single fire zone architecture, as it facilitates the concentration of all potential ignition sources in a tight volume.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the scope of the invention as set out in the claims.

The invention claimed is:

1. A gas turbine engine comprising:
 a nacelle;
 a casing structure radially inwards of the nacelle and providing an outer surface of an air flow duct of the engine,
 plural engine components located in a bay formed between the nacelle and the casing structure, the plural engine components being part of either a first set of components or a second set of components, wherein the first set of components are all components of the plural engine components which are potential ignition sources, and the second set of components are all remaining components of the plural engine components; and
 a container located in the bay, the container being fireproof such that the container is capable of withstanding an application of heat by a standard flame for 15 minutes,
 wherein the first set of components includes at least an accessory gearbox and the second set of components includes at least one or more engine electronic controllers and one or more electrical harnesses,
 wherein, with an exception of the one or more electrical harnesses, the container contains only the first set of components, and
 wherein the container envelopes the accessory gearbox.

2. The gas turbine engine according to claim 1, wherein the container is a single fireproof container located in the bay.

3. The gas turbine engine according to claim 1, wherein the first set of components includes the accessory gearbox and fuel lines which extend from the accessory gearbox.

4. The gas turbine engine according to claim 3, wherein the first set of components further includes hydraulic lines which extend from the accessory gearbox.

5. The gas turbine engine according to claim 1, wherein the second set of components includes the one or more engine electronic controllers, one or more oil tanks, oil lines which extend from the oil tanks, an aircraft air system, engine mounts for mounting the engine to an airframe, one or more air/oil heat exchangers, and the one or more electrical harnesses.

6. The gas turbine engine according to claim 5, wherein the engine mounts are formed of aluminium alloy or composite material.

7. The gas turbine engine according to claim 5, wherein the second set of components further includes one or more engine health monitoring units.

8. The gas turbine engine according to claim 1, wherein the accessory gearbox is aligned in an axial direction of the engine.

9. The gas turbine engine according to claim 1, wherein the container is at least partly recessed into the casing structure.

10. The gas turbine engine according to claim 1 which is a ducted fan engine, wherein the air flow duct is a bypass duct that surrounds a core engine.

* * * * *